United States Patent
Rittinger et al.

(10) Patent No.: US 12,153,696 B2
(45) Date of Patent: Nov. 26, 2024

(54) EFFICIENT SUPPORT FOR AUTOMATIC GENERATION OF A PARTIALLY-EDITABLE DATASET COPY

(71) Applicant: SAP SE, Walldorf (DE)

(72) Inventors: Jan Rittinger, Wiesloch (DE); Thomas Beck, Rosswein (DE); Sead Pozderac, Karlsruhe (DE); Gregor Hackenbroich, Hockenheim (DE); Anja Jugel, Dresden (DE); Adrian Mocan, Dresden (DE); Richard Pilz, Dresden (DE); Julian Harttung, Dresden (DE); Franz Josef Grueneberger, Dresden (DE); Johannes Meinecke, Heidelberg (DE); Jan Schole, St. Leon-Rot (DE)

(73) Assignee: SAP SE, Walldorf (DE)

(*) Notice: Subject to any disclaimer, the term of this patent is extended or adjusted under 35 U.S.C. 154(b) by 294 days.

(21) Appl. No.: 17/647,564

(22) Filed: Jan. 10, 2022

(65) Prior Publication Data
US 2023/0098745 A1     Mar. 30, 2023

Related U.S. Application Data

(60) Provisional application No. 63/247,920, filed on Sep. 24, 2021.

(51) Int. Cl.
*G06F 21/62*     (2013.01)
(52) U.S. Cl.
CPC .............. *G06F 21/6218* (2013.01)
(58) Field of Classification Search
CPC ............ G06F 21/6218; G06F 21/1062; G06F 21/6209; G06F 40/131; G06F 40/166
See application file for complete search history.

(56) References Cited

U.S. PATENT DOCUMENTS

| | | | |
|---|---|---|---|
| 7,616,642 B2 | 11/2009 | Anke et al. | |
| 7,616,960 B2 | 11/2009 | Anke et al. | |
| 7,676,522 B2 | 3/2010 | Klein et al. | |
| (Continued) | | | |

FOREIGN PATENT DOCUMENTS

JP     2009151371 A    *   7/2009

OTHER PUBLICATIONS

Extended European Search Report in European Appln. No. 22186717.9, dated Jan. 26, 2023, 6 pages.

(Continued)

*Primary Examiner* — Sm A Rahman
(74) *Attorney, Agent, or Firm* — Fish & Richardson P.C.

(57) ABSTRACT

The present disclosure involves systems, software, and computer implemented methods for automatically generating a partially-editable dataset copy. One example method includes receiving an edit request from a user to edit a data set. A filter for the data set is determined, based on a context of the edit request. The filter is used to generate a partially-editable copy of the data set that includes the editable portion of the data set. An exposed view of the data set is generated that exposes the partially-editable copy of the data set and a non-editable portion of the data set. The exposed view of the data set is provided to the user and a change to a data item in the editable portion of the data set is received. The data item in the partially-editable copy of the data set is updated based on the change.

18 Claims, 7 Drawing Sheets

(56) References Cited

U.S. PATENT DOCUMENTS

| | | | |
|---|---|---|---|
| 7,676,523 | B2 | 3/2010 | Klein et al. |
| 8,346,819 | B2 | 1/2013 | Do et al. |
| 9,721,002 | B2 | 8/2017 | Pfeifer et al. |
| 9,836,549 | B2 | 12/2017 | Heinrich et al. |
| 9,922,300 | B2 | 3/2018 | Rittinger et al. |
| 9,990,388 | B2 | 6/2018 | Meinecke et al. |
| 10,216,793 | B2 | 2/2019 | Ji et al. |
| 10,311,061 | B2 | 6/2019 | Ji et al. |
| 10,380,134 | B2 | 8/2019 | Su et al. |
| 11,113,261 | B2 | 9/2021 | Pilz et al. |
| 11,113,264 | B2 | 9/2021 | Rittinger |
| 11,829,437 | B2 * | 11/2023 | Goldstein ........... G06F 16/9577 |
| 2007/0078528 | A1 | 4/2007 | Anke et al. |
| 2013/0332813 | A1 | 12/2013 | Heinrich et al. |
| 2015/0149259 | A1 | 5/2015 | Song |
| 2017/0076101 | A1 | 3/2017 | Kochhar et al. |
| 2017/0315979 | A1 * | 11/2017 | Boucher ................. G06F 40/18 |
| 2018/0181552 | A1 * | 6/2018 | Konnola ................. G06F 16/93 |
| 2018/0335935 | A1 | 11/2018 | Larson et al. |
| 2019/0303545 | A1 | 10/2019 | Huang et al. |

OTHER PUBLICATIONS

Wikipedia.org [online], "Customer demand planning" created on May 2008, [retrieved on Dec. 29, 2021], retrieved from : URL <https://en.wikipedia.org/wiki/Customer_demand_planning>, 1 page.

Wikipedia.org [online], "Document collaboration" created on Jan. 2006, [retrieved on Dec. 29, 2021], retrieved from : URL <https://en.wikipedia.org/wiki/Document_collaboration>, 2 pages.

Wikipedia.org [online], "Version Control" created on Jun. 2002, [retrieved on Dec. 29, 2021], retrieved from : URL <https://en.wikipedia.org/wiki/Version_control>, 6 pages.

* cited by examiner

302 — Read/Write permissions managed for dimension Region

| Region ID | READ | WRITE |
|---|---|---|
| World | A, Admin | Admin |
| Europe | B | |
|   Germany | | A |
|   France | | B |
| America | | |
|   USA | | A |

303 — Region ID row
304 — World
306 — Europe
308 — Germany
312 — France
310 — USA 320 — (Effective privileges are recursively unfolded, see non-underlined below)

| Region ID | READ | WRITE |
|---|---|---|
| World | A, Admin | Admin |
| Europe | B, A, Admin | Admin |
|   Germany | A, B, Admin | A, Admin |
|   France | A, B, Admin | B, Admin |
| America | A, Admin | Admin |
|   USA | A, Admin | A, Admin |

340 — Data Locking permissions

| Time | Region | Version Actual | Budget 21 | Forecast 22 |
|---|---|---|---|---|
| 2020 | World | Locked | Locked | Locked |
| 2021 | World | Locked | Mixed | Locked |
| | Europe | Locked | Open | Locked |
| | America | Locked | Locked | Locked |
| 2022 | World | Open | Open | Open |

342 — Region column
344 — Time column
346 — Actual
348 — Budget 21
350 — Forecast 22
352, 356, 354, 358

Data Snapshot of Public Data for user Admin
(can read & write everything)

| Measure | Sales | | Budget 21 | Forecast 22 | MyActual | MyBudget | MyForecast | MyRestrFcst |
|---|---|---|---|---|---|---|---|---|
| Time | Region | Version Actual | | | | | | |
| 2020 | World | | 440 | - | 440 | | | |
| | Europe | | 190 | - | 190 | | | |
| | Germany | | 100 | - | 100 | | | |
| | France | | 90 | - | 90 | | | |
| | America | | 250 | - | 250 | | | |
| | USA | | 250 | - | 250 | | | |
| 2021 | World | | 255 | 260 | 458 | 255 | 260 | 260 |
| | Europe | | 480 | 480 | 183 | 480 | 480 | 480 |
| | Germany | | 210 | 210 | 95 | 210 | 210 | 210 |
| | France | | 110 | 110 | 88 | 110 | 110 | 110 |
| | America | | 100 | 100 | 275 | 100 | 100 | 100 |
| | USA | | 270 | 270 | 275 | 270 | 270 | 270 |
| | | | 270 | 270 | | 270 | 270 | 270 |
| 2022 | World | | 510 | 528 | - | 510 | 528 | 528 |
| | Europe | | 220 | 231 | - | 220 | 231 | 231 |
| | Germany | | 115 | 121 | - | 115 | 121 | 121 |
| | France | | 105 | 110 | - | 105 | 110 | 110 |
| | America | | 290 | 297 | - | 290 | 297 | 297 |
| | USA | | 290 | 297 | - | 290 | 297 | 297 |

MyActual is a snapshot of Actual version based on planning area for WRITE permission of dimension Region — 418
  Initial filter is: Region in (Germany, France, Europe, USA, America, World) — 420
  Effective filter are: none — 424
MyBudget is a snapshot of version Budget 21 based on planning area for data locking
  Initial filter is: (Region in (Germany, France, Europe, USA, America, World) and Time=2021) or (Region in (Germany, France, Europe, USA, America, World) and Time=2022) — 430
  Effective filter is: Time in (2021, 2022)
MyForecast is a snapshot of version Forecast 22 based on planning area for WRITE permission of dimension Region and data locking
  Initial filter is: Region in (Germany, France, Europe, USA, America, World) and ((Region in (Germany, France, Europe) and Time=2021) — 432
    or (Region in (Germany, France, Europe, USA, America, World) and Time=2022))
  Effective filter is: Time in (2021, 2020) — 436
MyRestrFcst is a snapshot of version Forecast 22 based on a cell context (L17:L22) in the grid when creating the version
  Initial filter is: Region in (Germany, France, Europe, USA, America, World) and Time (2022) — 438
  Effective filter is: Time in (2022)

FIG. 4

Data Snapshot of Public Data for user A (can read & write everything)

| Measure | | Version | Budget 21 | Forecast 22 | MyActual | MyBudget | MyForecast |
|---|---|---|---|---|---|---|---|
| Time | Sales Region | Actual | | | | | |
| 2020 | World | 440 | - | - | 440 | - | - |
| | Europe | 190 | - | - | 190 | - | - |
| | Germany | 100 | - | - | 100 | - | - |
| | France | 90 | - | - | 90 | - | - |
| | America | 250 | - | - | 250 | - | - |
| | USA | 250 | 255 | 260 | 250 | 255 | 260 |
| 2021 | World | 458 | 480 | 480 | 458 | 480 | 480 |
| | Europe | 183 | 210 | 210 | 183 | 210 | 210 |
| | Germany | 95 | 110 | 110 | 95 | 110 | 110 |
| | France | 88 | 100 | 100 | 88 | 100 | 100 |
| | America | 275 | 270 | 270 | 275 | 270 | 270 |
| | USA | 275 | 270 | 270 | 275 | 270 | 270 |
| 2022 | World | - | 510 | 528 | - | 510 | 528 |
| | Europe | - | 220 | 231 | - | 220 | 231 |
| | Germany | - | 115 | 121 | - | 115 | 121 |
| | France | - | 105 | 110 | - | 105 | 110 |
| | America | - | 290 | 297 | - | 290 | 297 |
| | USA | - | 290 | 297 | - | 290 | 297 |

MyActual is a snapshot of Actual version based on planning area for WRITE permission of dimension Region
 Initial filter is: Region in (Germany, USA)
 Effective filter is: Region in (Germany, USA)
MyBudget is a snapshot of version Budget 21 based on planning area for data locking
 Initial filter is: (Region in (Germany, France, Europe) and Time=2021) or (Region in (Germany, France, Europe, USA, America, World) and Time=2022)
 Effective filter is: Time in (2021, 2022)
MyForecast is a snapshot of version Forecast 22 based on planning area for WRITE permission of dimension Region and data locking
 Initial filter is: Region in (Germany, USA) and ((Region in (Germany, France, Europe) and Time=2021)
  or (Region in (Germany, France, Europe, USA, America, World) and Time=2022))
 Effective filter are: [Region in (Germany, USA), Time in (2021, 2020)]

FIG. 5

Data Snapshot of Public Data for user B (can read only in Europe)

| Measure Time | Sales Region | Version Actual | Budget 21 | Forecast 22 | MyActual | MyBudget | MyForecast |
|---|---|---|---|---|---|---|---|
| 2020 | Europe | 190 | - | - | 190 | - | - |
|  | Germany | 100 | - | - | 100 | - | - |
|  | France | 90 | - | - | 90 | - | - |
| 2021 | Europe | 183 | 210 | 210 | 183 | 210 | 210 |
|  | Germany | 95 | 110 | 110 | 95 | 110 | 110 |
|  | France | 88 | 100 | 100 | 88 | 100 | 100 |
| 2022 | Europe | - | 220 | 231 | - | 220 | 231 |
|  | Germany | - | 115 | 121 | - | 115 | 121 |
|  | France | - | 105 | 110 | - | 105 | 110 |

MyActual is a snapshot of Actual version based on planning area for WRITE permission of dimension Region
 Initial filter is: Region in (France)
 Effective filter is: Region in (France)
MyBudget is a snapshot of version Budget 21 based on planning area for data locking
 Initial filter is: (Region in (Germany, France, Europe) and Time=2021) or (Region in (Germany, France, Europe, USA, America, World) and Time=2022)
 Effective filter is: Time in (2021, 2022)
MyForecast is a snapshot of version Forecast 22 based on planning area for WRITE permission of dimension Region and data locking
 Initial filter is: Region in (France) and ((Region in (Germany, France, Europe) and Time=2021) or (Region in (Germany, France, Europe, USA, America, World) and Time=2022))
 Effective filter are: [Region in (France), Time in (2021, 2020)]

FIG. 6

EFFICIENT SUPPORT FOR AUTOMATIC GENERATION OF A PARTIALLY-EDITABLE DATASET COPY

CLAIM OF PRIORITY

This application claims priority under 35 USC § 119(e) to U.S. Provisional Patent Application Ser. No. 63/247,920, filed on Sep. 24, 2021 entitled "EFFICIENT SUPPORT FOR AUTOMATIC PARTIAL EDIT COPY", the entire contents of which are hereby incorporated by reference.

TECHNICAL FIELD

The present disclosure relates to computer-implemented methods, software, and systems for automatically generating a partially-editable dataset copy.

BACKGROUND

In an organization, different approaches can be used when multiple users want to edit the same document or data set. In one example, a given user can check out the document or data set which can allow that user to edit the document or data set and prevent other users from editing the document or data set. The user can check in the document or data set when the user is done editing the document or data set. As another example, some systems can allow collaborative concurrent editing of a same central document.

SUMMARY

The present disclosure involves systems, software, and computer implemented methods for automatically generating a partially-editable dataset copy. One example method includes: receiving an edit request from a user to edit a data set; determining, based on a context of the edit request, a first filter for the data set that defines an editable portion of the data set; using the first filter to generate a partially-editable copy of the data set that includes the editable portion of the data set; generating an exposed view of the data set that exposes the partially-editable copy of the data set and a non-editable portion of the data set; providing the exposed view of the data set to the user; receiving, in the exposed view, a change to a first data item in the editable portion of the data set; and updating the first data item in the partially-editable copy of the data set based on the change to the first data item.

Implementations may include one or more of the following features. The context of the edit request can specify at least one dimension of the data set. The context of the edit request can include a role of the user. The role can determine preconfigured data access permissions for the user. Determining the first filter for the data set can include determining, based on the preconfigured data access permissions, for which dimension values the user has write access. The context of the edit request can include preconfigured data locking permissions. Determining the first filter for the data set can include determining, based on preconfigured the data locking permissions, which dimension values are unlocked. Using the first filter to generate the partially-editable copy of the data set can include copying, into the partially-editable copy of the data set, portions of the data set that match the first filter. The non-editable portion of the data set exposed by the exposed view can be identified using a negation of the first filter. Updating the first data item in the partially-editable copy of the data set can include determining that the first data item matches the first filter. A change to a second data item that is included in the non-editable portion can be determined. A determination can be made that that the second data item does not match the first filter. The change to the second data item can be rejected based on determining that the second data item does not match the first filter. The first filter can be improved by adjusting the first filter based on a performance analysis.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 3 is a diagram that illustrates example configurations that are discussed in later planning area examples.

FIG. 4 illustrates data snapshots for an admin user.

FIG. 5 illustrates data snapshots for a first user.

FIG. 6 illustrates data snapshots for a second user.

DETAILED DESCRIPTION

In an organization, different approaches can be used when multiple users edit the same document or data set. In one example, a given user can check out the document or data set which can allow that user to edit the document or data set and prevent other users from editing the document or data set. As another example, some systems can allow collaborative concurrent editing of a same central document.

However, for some situations, users may require or desire more fine-grained controlled access to data sets. For example, a user may only need or desire access to a particular paragraph, section, or data slice of a data set. Locking an entire document may be overkill if the user only desires access to a portion of the data set. Additionally, in some cases, a user may copy a data set when working on the data set. Copying the entire data set when the user is only interested in working on a portion of the data set is not an efficient use of resources.

To improve efficiency and enable editing of portions of data sets, a partial edit engine can use a filter criterion to distinguish between an editable and non-editable portion of a data set. The filter can be used to create an editable subset of the data set. The editable subset of the data set can be presented in a view that also includes data of the data set that do not match the filter criterion. The user may desire to see non-editable data for reference, for example. The view can ensure that any data modified using the view matches the filter.

The partial edit engine can obtain various advantages. For example, when documents being edited are copied from a central data set, copying only editable portions into a partially-editable copy saves both processing and space resources. Additionally, performance of a view used for editing a data set can be improved, due to reduction in input enablement support for a fewer number of data cells. Additionally, queries, to populate or update an editable portion can be performed faster, as compared to queries that are based on an entire data set. With the solution, exclusive locks can affect smaller data regions and thus allow more parallelism. Additionally, conflict resolution checking for data writeback in parallel edits can be faster and require fewer processing resources due to decreased affected data region. As another example, changes of data outside of filtered data region by other users can be visible while a given user is editing a data set. Other advantages are described below.

Figure 1:
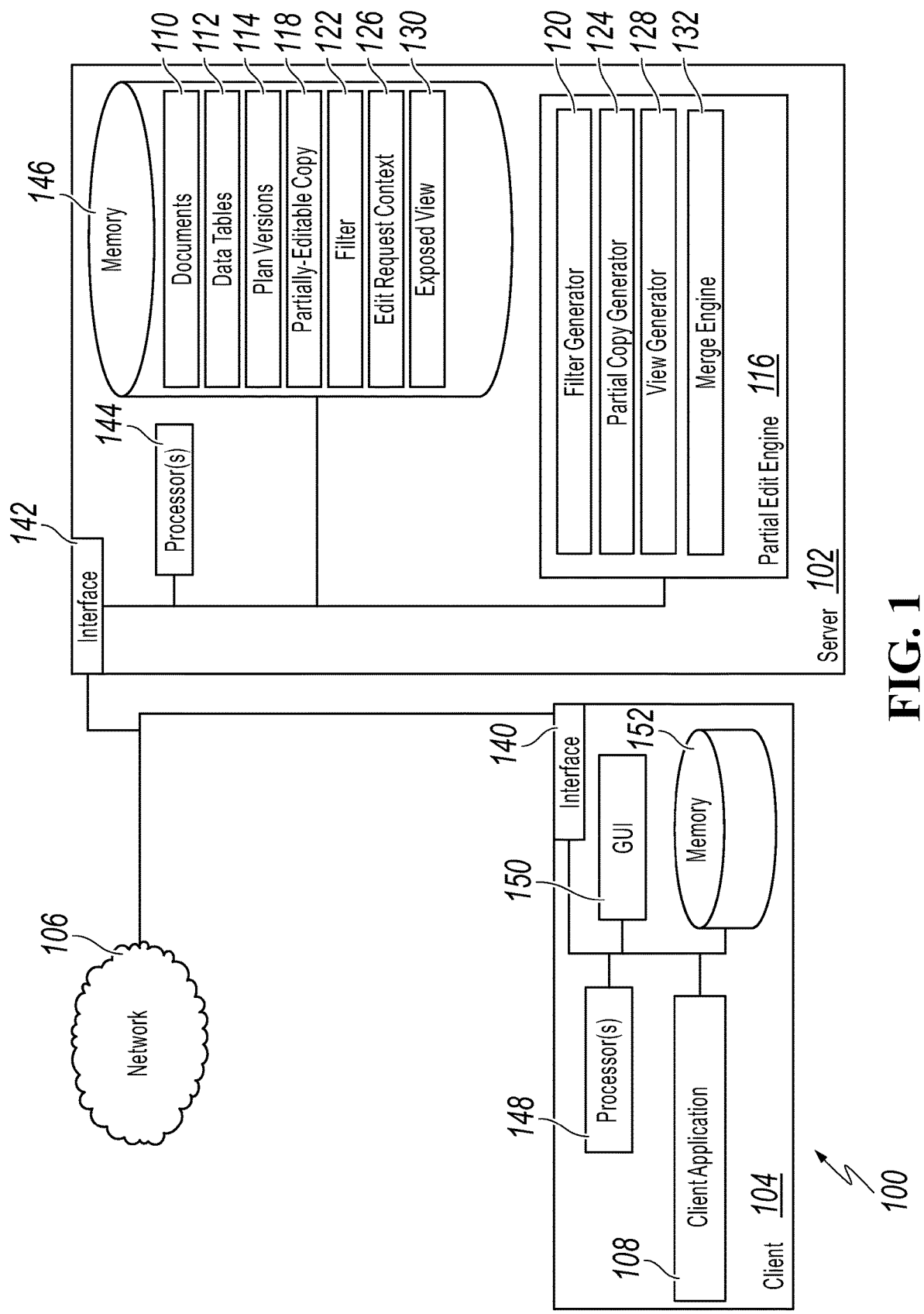
FIG. 1 is a block diagram illustrating an example system for automatically generating a partially-editable dataset copy.

FIG. 1 is a block diagram illustrating an example system 100 for automatically generating a partially-editable dataset copy. Specifically, the illustrated system 100 includes or is communicably coupled with a server 102, a client device 104, and a network 106. Although shown separately, in some implementations, functionality of two or more systems or servers may be provided by a single system or server. In some implementations, the functionality of one illustrated system or server may be provided by multiple systems or servers.

A user can use a client application 108 on the client device 104, to view and edit data, such as data provided by the server 102. For example, the user can use the client application 108 to view or edit data in a copy of a document 110, data from a data table 112, from a file, or from another type of data set. As a particular example, the client application 108 can be a planning application that can be used to perform planning by viewing or editing planning data that is stored in plan versions 114. Plan versions 114 can enable storing of separate sets of plan data for the same profit center, for example. For instance, different plan versions 114 can be used for an operational plan, a strategic plan, an optimistic plan, and/or a pessimistic plan, to name few examples.

When a user edits a data set (e.g., document, data table, plan version), the user may only be interested in editing a portion of the data set. For example, the user may only be interested in modifying a certain section of the document or data table, or may be interested in only working on certain data in a plan version 114. A partial edit engine 116 described herein can be used to create a partially-editable copy 118 of a data set. A filter generator 120 can generate a filter 122 that can be used to create the partially-editable copy 118, for example, as described in more detail below.

For instance, with planning versions, a user may create a private plan version which can include a snapshot of a public plan version. While planning with the private version, the user can plan without being affected by changes performed by other users. Accordingly, the user can perform planning simulations independently of other users. When creating the private plan version, data from the public version can be copied into the private version. To improve performance, a partial copy generator 124 of the partial edit engine 116 can use the filter 122 to create the partially-editable copy 118 that is a subset of a public planning version that includes data that matches the filter 122. Similar approaches can be used for other types of data sets, such as documents, data tables, files, etc.

In general, the filter generator 120 can determine the filter 122 based on context information 126 for an edit request of a data set. The filter 122 can define an editable portion of the data set. The context information 126 for the edit request can include, for example, requested dimension(s) to edit, a role of the user, preconfigured data access permissions for the user (which can be determined based on the role), preconfigured data locking permissions, or other types of context information that are described in more detail below with respect to FIG. 2.

As a particular example, when the context information 126 includes data access configurations, the filter generator 120 can define the filter 122 so that the filter 122 can be used by the partial copy generator 124 to retrieve data for which the user has write access. As another example, when the context information 126 includes data locking configurations, the filter generator 120 can define the filter 122 so that the filter 122 can be used by the partial copy generator 124 to retrieve data that is unlocked. In general, for a given data set, the partial copy generator 124 can use the filter 122 to generate the partially-editable copy 118 that includes an editable portion of the data set. Particularly, the partial copy generator 124 can copy portions of the data set that match the filter 122 into the partially-editable copy 118.

When the data set is a public plan version, the partially-editable copy 118 can be a private plan version that includes a recommended planning area (e.g., where the recommended planning area is determined based on the filter 122 that is generated based on the context information 126). Planning using the recommended planning area can improve performance as compared to planning using a private plan version that is a full copy of a public plan version. Similar performance gains can be obtained when the partially-editable copy 118 is an editable portion of other types of data sets.

To enable editing of the partially-editable copy 118, a view generator 128 can generate an exposed view 130 that exposes both the partially-editable copy 118 of the data set and a non-editable portion of the data set. The non-editable portion of the data set exposed by the exposed view 130 can be identified (or generated) using a negation of the filter 122. The exposed view 130 can enable the user to see both editable data in the partially-editable copy 118 and other non-editable data (e.g., for reference) without having to switch views or contexts.

As described below, various approaches can be used to ensure that the exposed view 130 is used for editing only data in the partially-editable copy 118 and not other data. For example, the exposed view 130 can explicitly prevent users from modifying data in the non-editable portion. As another example, the exposed view 130 can include or request functionality that determines whether a data item being modified matches the filter 122. If the data item being modified matches the filter 122, the modification can be accepted. If the data item being modified does not match the filter 122, the modification can be rejected and the user can be notified. For instance, the exposed view 130 can notify the user that planning outside of a recommended planning area is not allowed. In summary, different approaches, including up-front prevention or "lazy" checking (e.g., initially allow an edit but prevent ultimate saving in a later step) can be performed. In examples below, "disabling editing" or other descriptions can refer to any suitable approach, including up-front or lazy approaches).

For some data sets, such as planning versions, multiple copies of the data set (e.g., multiple private versions) may be being edited by multiple users. A merge engine 132 can resolve merging of changes in multiple partially-editable copies of a data set back into a central data set. For planning versions, the merge engine can analyze the public version from which a private version was generated, that particular private version, and other private versions previously checked in that may have had modifications that overlap those done for the particular private version.

As used in the present disclosure, the term "computer" is intended to encompass any suitable processing device. For example, although FIG. 1 illustrates a single server 102, and a single client device 104, the system 100 can be implemented using a single, stand-alone computing device, two or more servers 102, or two or more client devices 104. Indeed, the server 102 and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client device 104 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 140 and 142 are used by the client device 104 and the server 102, respectively, for communicating with other systems in a distributed environment—including within the system 100—connected to the network 106. Generally, the interfaces 140 and 142 each comprise logic encoded in software and/or hardware in a suitable combination and operable to communicate with the network 106. More specifically, the interfaces 140 and 142 may each comprise software supporting one or more communication protocols associated with communications such that the network 106 or interface's hardware is operable to communicate physical signals within and outside of the illustrated system 100.

The server 102 includes one or more processors 144. Each processor 144 may be a central processing unit (CPU), a blade, an application specific integrated circuit (ASIC), a field-programmable gate array (FPGA), or another suitable component. Generally, each processor 144 executes instructions and manipulates data to perform the operations of the server 102. Specifically, each processor 144 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 146. In some implementations, the server 102 includes multiple memories. The memory 146 may include any type of memory or database module and may take the form of volatile and/or non-volatile memory including, without limitation, magnetic media, optical media, random access memory (RAM), read-only memory (ROM), removable media, or any other suitable local or remote memory component. The memory 146 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The client device 104 may generally be any computing device operable to connect to or communicate with the server 102 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the client application 108. A client application is any type of application that allows the client device 104 to request and view content on the client device 104. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 further includes one or more processors 148. Each processor 148 included in the client device 104 may be a central processing unit (CPU), an application specific integrated circuit (ASIC), a field-programmable gate array (FPGA), or another suitable component. Generally, each processor 148 included in the client device 104 executes instructions and manipulates data to perform the operations of the client device 104. Specifically, each processor 148 included in the client device 104 executes the functionality required to send requests to the server 102 and to receive and process responses from the server 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the server 102, or the client device 104 itself, including digital data, visual information, or a GUI 150.

The GUI 150 of the client device 104 interfaces with at least a portion of the system 100 for any suitable purpose, including generating a visual representation of the client application 108. In particular, the GUI 150 may be used to view and navigate various Web pages, or other user interfaces. Generally, the GUI 150 provides the user with an efficient and user-friendly presentation of business data provided by or communicated within the system. The GUI 150 may comprise a plurality of customizable frames or views having interactive fields, pull-down lists, and buttons operated by the user. The GUI 150 contemplates any suitable graphical user interface, such as a combination of a generic web browser, intelligent engine, and command line interface (CLI) that processes information and efficiently presents the results to the user visually.

Memory 152 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 152 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the server 102 and/or the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

Figure 2:
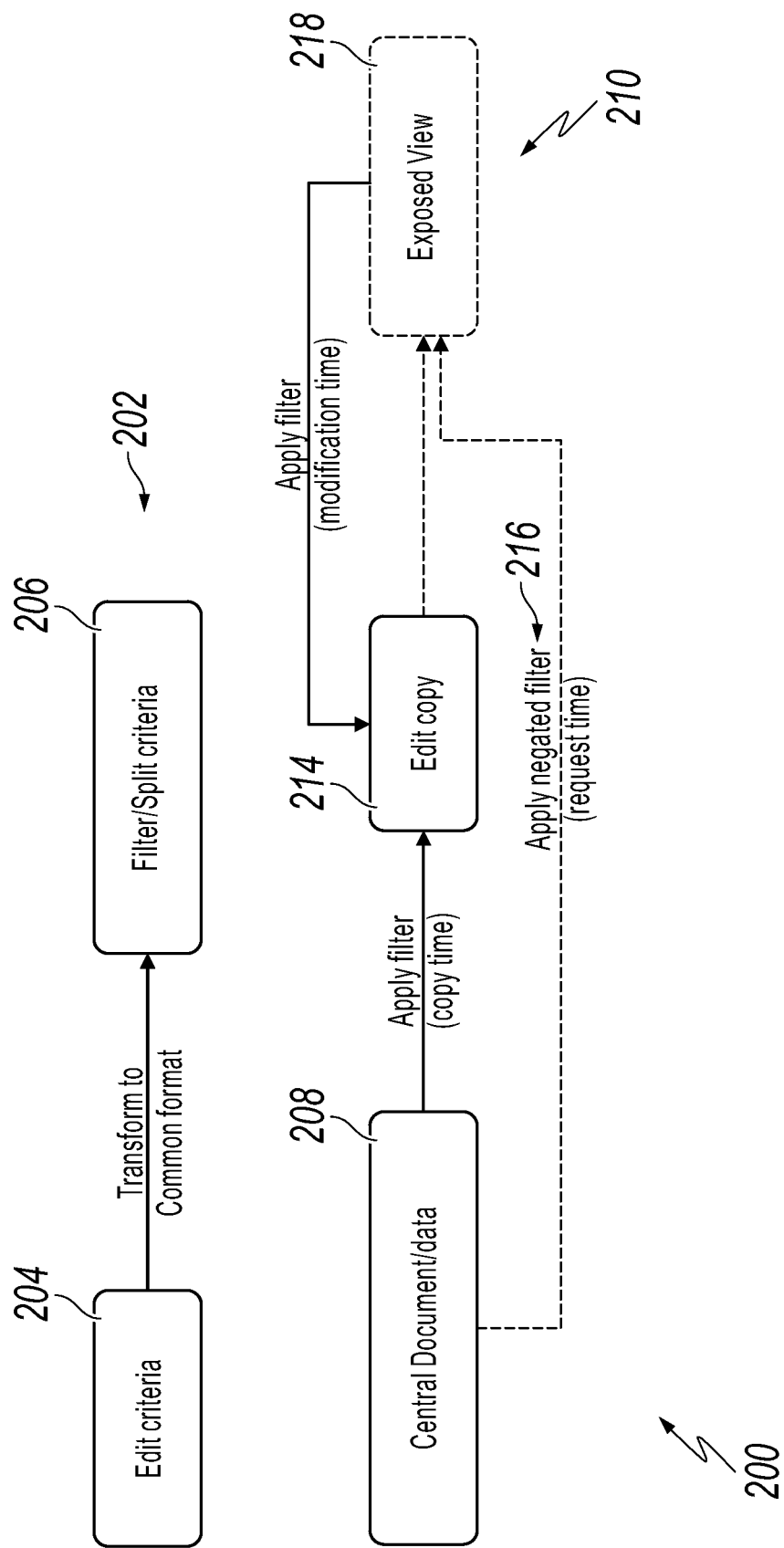
FIG. 2 illustrates flowcharts for creating a partially-editable data set.

FIG. 2 illustrates flowcharts 200 for creating a partially-editable data set. For example, as shown in a flowchart 202, an edit criteria 204 (e.g., a context of an edit request) can be transformed to a filter 206. The filter 206 can be used as a split criteria to filter a central data set 208. For example, as shown in a flowchart 210, the filter 206 can be applied to the central data set 208 to create a partially-editable copy 214 of the central data set 208. The filter 206 can define what areas of the central data set 208 are editable in the exposed view 218. When the central data set 208 is a planning version, the filter 206 can define a recommended planning area, for example. When the user is editing the partially-editable copy 214, a negated filter 216 (e.g., a negative of the filter 206) can be generated and applied to the central data set 208 to create an exposed view 218 that enables the user to view non-editable data that is not editable in the partially-editable copy 214.

There can be various types of edit criteria 204 or types of context of an edit request. For example, the edit criteria 204 can include data access control and/or data locking, as described in more detail below with respect to FIG. 3. Other examples of edit criteria or edit context can include one or more of a visible context (data that a user is currently viewing), user-specified filter criteria specified at edit time, a criteria previously defined by a modeling user for a data model of the central data set 208, or other types of edit criteria or edit context. When the central data set 208 is a document, the edit criteria 204 can be a semantic description of a portion of the document (such as a section name, a worksheet name, etc.).

The transformation illustrated in the flowchart 202 can be performed to shield end users from technical detail that may be used in the filter 206. For instance, the edit criteria 204 can be inferred from the context of an edit request and/or can be specified by the user using semantic references that the user is familiar with from use of a product. For example, the user can select known entities or artifacts (e.g., data locking, data access) that are exposed in the product to define a portion of the central data set 208 that the user wishes to edit. The filter transformation process illustrated in the flowchart 202 can transform semantic information specified by the edit criteria 204 into technical information that can be used to generate the partially-editable copy 214 from the central data set 208. In some cases, edit criteria 204 such as data locking and/or data access control can be preconfigured (e.g., before edit time) and the filter 206 can be generated based on the edit criteria 204 without further user interaction.

The exposed view 218 exposes the partially-editable copy 214 and a non-editable portion of the data set. For example, while the exposed view 218 can appear to display the complete central data set 208 (possibly with scrolling or drilling), the exposed view 218 can actually display an editable partially-editable copy 214 and a read-only non-editable portion. The non-editable portion can be made read-only in various ways. For example, the exposed view 218 can prohibit editing of the read-only portion. As another example, the exposed view 218 can generate an error message if the user attempts to edit the non-editable portion. The exposed view 218 can enable the user to see the partially-editable copy 214 along with the non-editable portion without switching context or user interfaces, for example. As a particular example, suppose application of the filter 206 enables the user to edit year 2022 data in the central data set 208. The exposed view 218 can include year 2021 data (among other data), for reference, so the user doesn't have to switch to another interface or switch context to view the year 2021 data.

The non-editable read-only portion in the exposed view 218 can be generated using a negation of the filter 206. For example, when the edit criteria 204 is or includes data locking, the filter 206 can be used to identify unlocked data of the central data set 208 to be included in the partially-editable copy 214 of the data set. A negation of the filter 206 can be used to identify locked data that can be included (e.g., as read-only data) in the exposed view 218.

In addition to generating the filter 206 from the edit criteria 204, a filter optimization process can be performed to optimize the filter 206. For example, the filter 206 can be analyzed for performance. If estimated performance of using the filter 206 (or using a negated filter that is a negation of the filter 206) is unacceptable, the filter optimization process can include identifying an alternate, or optimized filter, as a replacement for the filter 206. For example, in some cases, the filter 206 can be simplified. For instance, a relevance analysis can determine that some parts of the filter 206 are not relevant to a current data set or a current context and can be removed from the filter 206. In further detail, in some cases, to ensure that filters in a multi-dimensional data set on dimensions with a large list of members are not negatively affecting performance, some potentially expensive dimensions filters can be pruned from the filter 206. As another example, to ensure that use of the filter (e.g., during querying and user activity) is not negatively affecting performance, the filter 206 can be normalized into Cartesian filters on dimension member identifiers.

FIG. 3 is a diagram 300 that illustrates example configurations that are discussed in later planning area examples. For instance, a table 302 includes read and write permissions for a hierarchical region dimension 303, which can be based on user roles or other configurations. For example, a user A and an admin user have read permissions for a World region 304 and all its descendants (306, 308, 310, 312, and America). The admin user has write permissions for the World region 304 and all its descendants. The user A has write permissions for a Germany region 308 and a USA region 310. A user B has read permissions for a Europe region 306 (including 308 and 310). The user B has write permissions for a France region 312. A table 320 illustrates recursively unfolding of effective privileges along the hierarchy. For example, based on the read privileges of the user A and the admin user for the World region 304, both the user A and the admin user effectively have read privileges for every sub region of the World region 304.

When data access control is identified as a criteria to use when defining a filter, the filter can be based on the user's effective privileges. For example, a filter can be defined for a current user that identifies data from a data model that can be written by the current user. When the filter is applied to create a partially-editable copy of a data set, the copy can include data for which the current user has write access. As an example, for some data models, some users may be granted relatively broad read access and relatively narrow write access. By including only data to which a user has write access, the partially-editable copy of the data set can be substantially smaller than the entire data set.

A table 340 illustrates example configured data locking permissions for a hierarchical region dimension 342 and a time dimension 344. The table 340 includes data locking permissions for an actual version 346, a "budget 21" version 348, and a "forecast 22" version 350. For example, for the actual version 346, all combinations of time and region dimensions are configured as locked except for a combination of the year 2022 and the World region (e.g., as shown by an open data locking configuration 352). For the "budget 21" version 348, all combinations of time and region dimensions are configured as locked except for a combination of the year 2021 and the Europe region and a combination of the year 2022 and the World region (e.g., as shown by open data locking configurations 354 and 356, respectively). Similar to the actual version 346, for the "forecast 22" version 350, all combinations of time and region dimensions are configured as locked except for a combination of the year 2022 and the World region (e.g., as shown by an open data locking configuration 358).

When data locking is identified as a criteria to use when defining a filter, the filter can be based on the data locking configurations illustrated in the table 340. For example, since open data locking configurations can define which data areas of a data set are editable, using data locking configurations for a filter can reduce an amount of data included in a partially-editable copy of the data set.

FIG. 4 illustrates data snapshots 400 for an admin user. As described above with respect to FIG. 3, the admin user can both read and write data for a region dimension 402. An actual version 404, a "budget 21" version 406, and a "forecast 22" version 408 are public planning versions. A "MyActual" version 410, a "MyBudget" version 412, a "MyForecast" version 414, and a "MyRestrFcst" version 416 are each private versions with restricted planning area snapshots that are based on a public version.

For example, as indicated by a note 418, the "MyActual" version 410 is a snapshot of the actual version 404 that is based on a planning area for write permission of the region dimension 402. A filter 420 can be defined based on write permissions for the admin user as defined in the table 302. For instance, since the admin user has full write privileges, the filter 420 can be used to retrieve data for all regions. Other examples below discuss generation of an effective filter from an initial filter, but as indicated by a note 422, for the example of a planning area based on write permissions for the admin user, the filter 420 can be used.

As indicated by a note 424, the "MyBudget" version 412 is a snapshot of the "Budget 21" version 406 that is based on a planning area for data locking. An initial filter 426 can be defined, based on the data locking configurations illustrated in the table 340. For instance, the initial filter 426 can be used to retrieve unlocked European data for the year 2021 and unlocked data for the year 2022 for all regions. In some cases, the initial filter 426 can be transformed into an effective filter 428. The effective filter 428 can be more efficient, as described above for filter optimizations. The effective filter 428 can be generated, for example, using a Cartesian filtering approach in which it is determined that region dimensions can be removed. The effective filter 428 can thus retrieve data for any region for the years 2021 or 2022. The presentation of the "MyBudget" version 412 includes enabling (e.g., in an exposed view) editing of data for year 2021 or year 2022 and disabling editing of data for year 2020. Edits in USA for year 2021 succeed due to the effective filter. Data locking, however, if not performed lazily, may prohibit changes in a more fine-grained manner. For example, if data locking is not performed lazily and if a user attempts to edit non-European data for year 2021, an error message can be generated.

As indicated by a note 430, the "MyForecast" version 414 is a snapshot of the "Forecast 22" version 408 that is based on a planning area for write permission of the region dimension 402 and for data locking. An initial filter 432 can be generated based on both the data access permissions and the data locking configurations described above with respect to FIG. 3. The initial filter 432 can be transformed, using a filter optimization process, into a more simplified effective filter 434 (e.g., similar to the effective filter 428). The presentation of the "MyForecast" version 414 includes enabling (e.g., in an exposed view) editing of data for year 2021 or year 2022 and disabling editing of data for year 2020.

As indicated by a note 436, the "MyRestrFcst" version 416 is a snapshot of the "Forecast 22" version 408 that is based on a cell context (e.g., cells L17:L22, as illustrated inside of a rectangle 437) of a data grid when the version was created. An initial filter 438 can be generated based on data that is displayed in the cells L17:L22 of the displayed data grid. The initial filter 438 can be transformed, using a filter optimization process, into an effective filter 440 that matches data for year 2022 (e.g., similar to the effective filter 428). The presentation of the "MyRestrFcst" version 416 can include enabling (e.g., in an exposed view) editing of data for year 2022 (e.g., as shown in a rectangle 441) and disabling editing of data for year 2020 or year 2021. A region 442 of cells highlighted in a first style that is a different style than used for the rectangle 441 can indicate a non-planning area in an exposed view, for example. Other areas of the data snapshots 400 (and other areas of other snapshots described below with respect to FIG. 5 and FIG. 6) are similarly styled using the first style, to indicate items in non-planning areas. As an example, in an exposed view, cells in a planning area may be styled using a white background and the first style for indicating cells in a non-planning area may be use of a gray background.

FIG. 5 illustrates data snapshots 500 for a first user. The first user can be the "user A" that, as described above with respect to FIG. 3, has read permission for regions in a region dimension that are included in a World region 502. The user A has write permissions for a Germany region 503 and a USA region 504. Similar to the example of FIG. 4, an actual version 505, a "budget 21" version 506, and a "forecast 22" version 508 are public planning versions. A "MyActual" version 510, a "MyBudget" version 512, and a "MyForecast" version 514 are each private versions with restricted planning area snapshots.

Similar to the example of FIG. 4, as indicated by a note 518, the "MyActual" version 510 is a snapshot of the actual version 505 that is based on a planning area for write permission of the region dimension 501. An initial filter 520 can be generated based on the write permissions for the first user. For example, the initial filter 520 can be used to retrieve data from the Germany region and the USA region for which the first user has write access. In this example, an effective filter 522 is the same as the initial filter 520 (e.g., no filter optimizations were performed). The effective filter 522 for the "user A" is different from the effective filter 422 for the administrative user, for a same semantic criteria of the planning area write permission for the dimension region. The presentation of the "MyActual" version 510 includes enabling (e.g., in an exposed view) editing of data for the Germany or USA regions and disabling of data outside of the Germany and USA regions.

As indicated by a note 524, the "MyBudget" version 512 is a snapshot of the "Budget 21" version 506 that is based on a planning area for data locking. Similar to the initial filter 426 described above with respect to FIG. 4, an initial filter 526 can be defined, based on the data locking configurations illustrated in the table 340. For instance, the initial filter 526 can be used to retrieve unlocked European data for the year 2021 and unlocked data for the year 2022 for all regions. The initial filter 526 can be transformed into an effective filter 528, as described above for the effective filter 428. The presentation of the "MyBudget" version 512 includes enabling (e.g., in an exposed view) editing of data for year 2021 or year 2022 and disabling editing of data for year 2020.

As indicated by a note 530, the "MyForecast" version 514 is a snapshot of the "Forecast 22" version 508 that is based on a planning area for write permission of the region dimension 501 and for data locking. An initial filter 532 can be generated based on both the data access permissions and the data locking configurations described above with respect to FIG. 3. The initial filter 532 can be transformed, using a filter optimization process, into a more simplified effective filter 534. For example, the initial filter 532 can be first transformed into a Cartesian filter with a first condition on dimension region and a second condition on region time. The effective filter 534 for the "user A" is different from the effective filter 434 for the administrative user, for a same semantic criteria of the planning area for writer permission for the dimension region and data locking. The presentation of the "MyForecast" version 514 includes enabling (e.g., in an exposed view) disabling editing of data for year 2020 and enabling editing of data for year 2021 or year 2022 that is for either the Germany or USA regions.

FIG. 6 illustrates data snapshots 600 for a second user. The second user can be the "user B" that, as described above with respect to FIG. 3, has read permission for a Europe region 602 and write permission for a France region 604. The user B has write permission for a France region 604. Similar to the examples of FIG. 4 and FIG. 5, an actual version 605, a "budget 21" version 606, and a "forecast 22" version 608 are public versions. A "MyActual" version 610, a "MyBudget" version 612, and a "MyForecast" version 614 are each private versions with restricted planning area snapshots.

Similar to the examples of FIG. 4 and FIG. 5, as indicated by a note 618, the "MyActual" version 610 is a snapshot of the actual version 605 that is based on a planning area for write permission of the region dimension 601. An initial filter 620 can be generated based on the write permissions for the second user. For example, the initial filter 620 can be used to retrieve data from the France region 604. An effective filter 622 is the same as the initial filter 620 (e.g., no filter optimizations are applied). The effective filter 622 for the "user B" is different from the effective filter 422 for the administrative user and the effective filter 522 for the "user A", for a same semantic criteria of the planning area write permission for the dimension region. The presentation of the "MyActual" version 610 includes enabling (e.g., in an exposed view) editing of data for the France region and disabling editing of other data.

As indicated by a note 624, the "MyBudget" version 612 is a snapshot of the "Budget 21" version 606 that is based on a planning area for data locking. Similar to the initial filter 426 described above with respect to FIG. 4, an initial filter 626 can be defined, based on the data locking configurations illustrated in the table 340. For instance, the initial filter 526 can be used to retrieve unlocked European data for the year 2021 and unlocked data for the year 2022 for all regions. The initial filter 626 can be transformed into an effective filter 628, as described above for the effective filter 428. The presentation of the "MyBudget" version 612 includes enabling (e.g., in an exposed view) editing of data for year 2021 or year 2022 and disabling data for other years.

As indicated by a note 630, the "MyForecast" version 614 is a snapshot of the "Forecast 22" version 608 that is based on a planning area for write permission of the region dimension 601 and for data locking. An initial filter 632 can be generated based on both the data access permissions and the data locking configurations described above with respect to FIG. 3. The initial filter 632 can be transformed, using a filter optimization process, into a more simplified effective filter 634 (e.g., similar to the effective filter 534). The effective filter 634 for the "user B" is different from the effective filter 434 for the administrative user and the effective filter 534 for the "user A", for a same semantic criteria of the planning area for writer permission for the dimension region and data locking. The presentation of the "MyForecast" version 614 includes enabling (e.g., in an exposed view) editing of data for the France region that is for year 2021 or year 2022 and disabling editing of other data.

Figure 7:
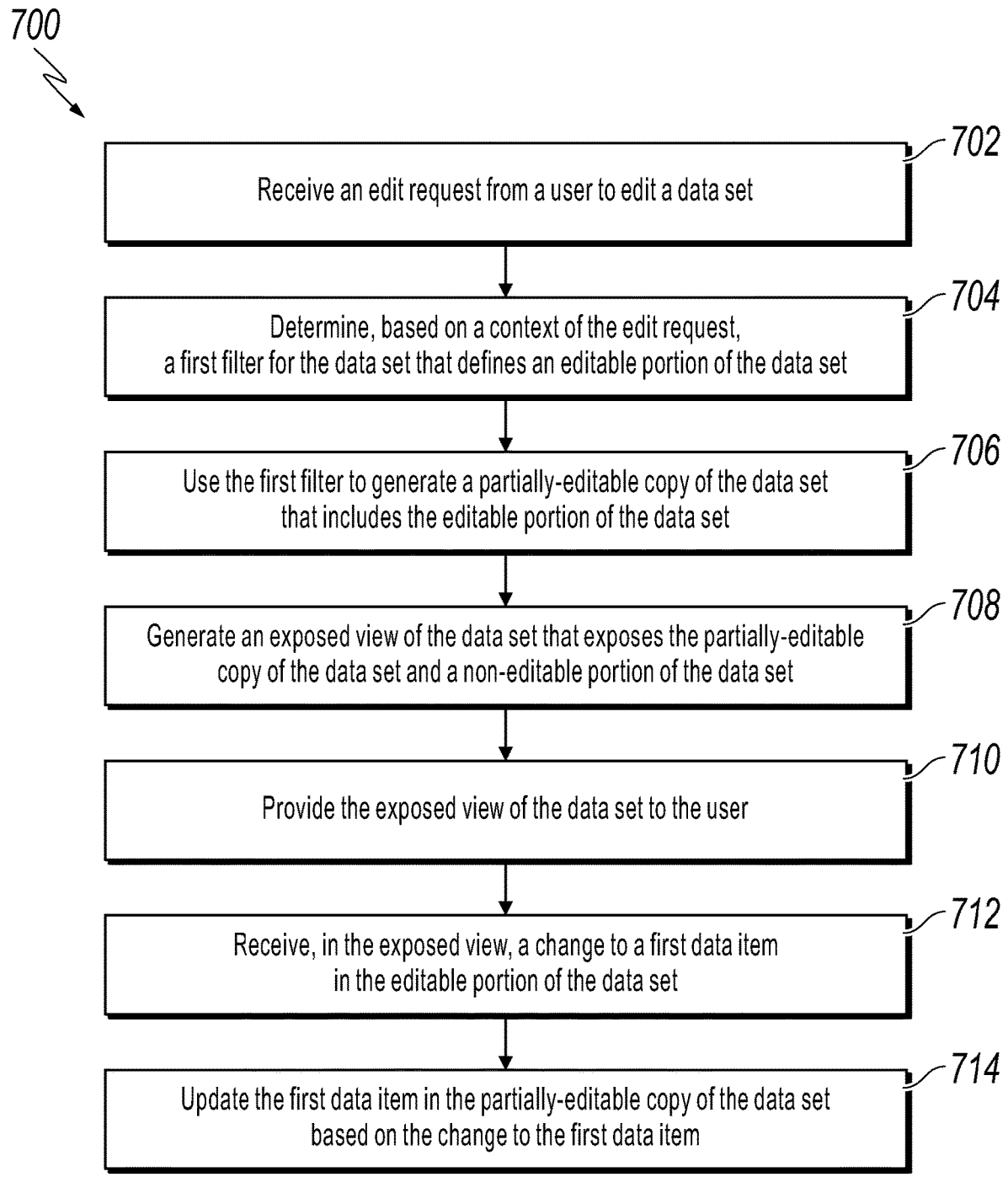
FIG. 7 is a flowchart of an example method for automatically generating a partially-editable dataset copy.

FIG. 7 is a flowchart of an example method 700 for automatically generating a partially-editable dataset copy. It will be understood that method 700 and related methods may be performed, for example, by any suitable system, environment, software, and hardware, or a combination of systems, environments, software, and hardware, as appropriate. For example, one or more of a client, a server, or other computing device can be used to execute method 700 and related methods and obtain any data from the memory of a client, the server, or the other computing device. In some implementations, the method 700 and related methods are executed by one or more components of the system 100 described above with respect to FIG. 1. For example, the method 700 and related methods can be executed by the partial edit engine 116 of FIG. 1.

At 702, an edit request to edit a data set is received from a user. The data set can be a document, a file, a data table, or a planning version, to name a few examples.

At 704, a first filter is determined for the data set, based on a context of the edit request, that defines an editable portion of the data set. A context of the edit request can include a user role. A user's role can determine data access restrictions or permissions or particular data locking configurations that may be in place for the user. For example, the edit request can be associated with one or more preconfigured specifications to use data locking, data access control, or another configuration when editing the data set. As another example, the context of the edit request can include a visible context of a particular visible portion of the data set. Other edit context examples include a story context or a user-specified semantic entity (e.g., a document section) that the user wishes to edit.

The first filter that is determined based on the data set can include technical information describing the editable portion that is generated based on a user's semantic specification. For example, a user's specification of a document section can be transformed into particular page and line number of a document. As another example, a configuration of data locking and a context of a particular dimension for the edit request can be transformed into a specification of dimension values that are not locked for the user. Similarly, a configuration of data access control and a context of a particular dimension for the edit request can be transformed into a specification of dimension values for which the user has write access.

At 706, the first filter is used to generate a partially-editable copy of the data set that includes the editable portion of the data set. For example, portions of the data set that match the first filter can be copied into the partially-editable copy of the data set.

At 708, an exposed view of the data set is generated that exposes the partially-editable copy of the data set and a non-editable portion of the data set. The non-editable portion of the data set exposed by the exposed view can be identified (or generated) using a negation of the first filter.

At 710, the exposed view of the data set is provided to the user. For example, the exposed view can be presented on a user interface of a user device.

At 712, a change to a first data item in the editable portion of the data set is received, in the exposed view. The first data item matches the first filter.

At 714, the first data item in the partially-editable copy of the data set is updated based on the change to the first data item. A determination can be made that the first data item matches the first filter before the first data item is updated.

In some cases, a change to a second data item that is included in the non-editable portion can be received (e.g., such as if the non-editable portion allows an attempt of an edit). A determination can be made that the second data item does not match the first filter. The change to the second data item can be rejected based on the second data item not matching the first filter.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
   receiving an edit request from a user to edit a data set;
   determining, based on a context of the edit request, a first filter for the data set that defines an editable portion of the data set, wherein the context of the edit request comprises preconfigured data locking permissions;
   identifying a non-editable portion of the data set using a negated filter that is a negation of the first filter;
   using the first filter to generate a partially-editable copy of the data set that includes the editable portion of the data set;
   generating an exposed view of the data set that exposes the partially-editable copy of the data set and the non-editable portion of the data set;
   providing the exposed view of the data set to the user;
   receiving, in the exposed view, a change to a first data item in the editable portion of the data set; and
   updating the first data item in the partially-editable copy of the data set based on the change to the first data item.

2. The computer-implemented method of claim 1, wherein the context of the edit request specifies at least one dimension of the data set.

3. The computer-implemented method of claim 2, wherein the context of the edit request includes a role of the user.

4. The computer-implemented method of claim 3, wherein the role determines preconfigured data access permissions for the user.

5. The computer-implemented method of claim 4, wherein determining the first filter for the data set comprises determining, based on the preconfigured data access permissions, for which dimension values the user has write access.

6. The computer-implemented method of claim 1, wherein determining the first filter for the data set comprises determining, based on preconfigured the data locking permissions, which dimension values are unlocked.

7. The computer-implemented method of claim 1, wherein using the first filter to generate the partially-editable copy of the data set comprises copying, into the partially-editable copy of the data set, portions of the data set that match the first filter.

8. The computer-implemented method of claim 1, wherein updating the first data item in the partially-editable copy of the data set comprises determining that the first data item matches the first filter.

9. The computer-implemented method of claim 1, further comprising:
   receiving a change to a second data item that is included in the non-editable portion;
   determining that the second data item does not match the first filter; and rejecting the change to the second data item based on determining that the second data item does not match the first filter.

10. The computer-implemented method of claim 1, further comprising improving the first filter by adjusting the first filter based on a performance analysis.

11. A system comprising:
one or more computers; and
a computer-readable medium coupled to the one or more computers having instructions stored thereon which, when executed by the one or more computers, cause the one or more computers to perform operations comprising:
receiving an edit request from a user to edit a data set;
determining, based on a context of the edit request, a first filter for the data set that defines an editable portion of the data set, wherein the context of the edit request comprises preconfigured data locking permissions;
identifying a non-editable portion of the data set using a negated filter that is a negation of the first filter;
using the first filter to generate a partially-editable copy of the data set that includes the editable portion of the data set;
generating an exposed view of the data set that exposes the partially-editable copy of the data set and the non-editable portion of the data set;
providing the exposed view of the data set to the user;
receiving, in the exposed view, a change to a first data item in the editable portion of the data set; and
updating the first data item in the partially-editable copy of the data set based on the change to the first data item.

12. The system of claim 11, wherein the context of the edit request specifies at least one dimension of the data set.

13. The system of claim 12, wherein the context of the edit request includes a role of the user.

14. The system of claim 13, wherein the role determines preconfigured data access permissions for the user.

15. A computer program product encoded on a non-transitory storage medium, the product comprising non-transitory, computer readable instructions for causing one or more processors to perform operations comprising:
receiving an edit request from a user to edit a data set;
determining, based on a context of the edit request, a first filter for the data set that defines an editable portion of the data set, wherein the context of the edit request comprises preconfigured data locking permissions;
identifying a non-editable portion of the data set using a negated filter that is a negation of the first filter;
using the first filter to generate a partially-editable copy of the data set that includes the editable portion of the data set;
generating an exposed view of the data set that exposes the partially-editable copy of the data set and the non-editable portion of the data set;
providing the exposed view of the data set to the user;
receiving, in the exposed view, a change to a first data item in the editable portion of the data set; and
updating the first data item in the partially-editable copy of the data set based on the change to the first data item.

16. The computer program product of claim 15, wherein the context of the edit request specifies at least one dimension of the data set.

17. The computer program product of claim 16, wherein the context of the edit request includes a role of the user.

18. The computer program product of claim 17, wherein the role determines preconfigured data access permissions for the user.

* * * * *